United States Patent [19]

Smith

[11] Patent Number: 5,612,845
[45] Date of Patent: Mar. 18, 1997

[54] METHOD AND APPARATUS FOR IN-SITU DETECTION OF DATA STORAGE SYSTEM SPINDLE MOTOR PERFORMANCE DEGRADATION

[75] Inventor: Gordon J. Smith, Rochester, Minn.

[73] Assignee: International Business Machines Corporation, Armonk, N.Y.

[21] Appl. No.: 364,088

[22] Filed: Dec. 27, 1994

[51] Int. Cl.$^6$ .................................................. G11B 33/10
[52] U.S. Cl. .......................... 360/137; 360/77.06; 369/58
[58] Field of Search ................................... 360/137, 106, 360/77.03, 77.04, 77.06, 77.08, 77.05; 369/32, 53, 54, 58, 275.3

[56] References Cited

U.S. PATENT DOCUMENTS

| | | | |
|---|---|---|---|
| 4,872,071 | 10/1989 | Easton et al. | 360/31 |
| 4,939,599 | 7/1990 | Chainer et al. | 360/77.03 |
| 4,967,292 | 10/1990 | Moteki | 360/78.13 |
| 5,038,625 | 8/1991 | Chen | 73/865.9 |
| 5,101,395 | 3/1992 | Cardero et al. | 369/59 |
| 5,130,866 | 7/1992 | Klaassen et al. | 360/75 |
| 5,164,932 | 11/1992 | Fennema et al. | 369/44.29 |
| 5,168,413 | 12/1992 | Coker et al. | 360/137 |
| 5,210,660 | 5/1993 | Hetzler | 360/77.08 |
| 5,268,893 | 12/1993 | Call et al. | 369/116 |
| 5,452,285 | 9/1995 | Monen | 369/275.3 |
| 5,455,724 | 10/1995 | Suzuki et al. | 360/77.04 |
| 5,483,515 | 1/1996 | Cheng et al. | 369/124 |

Primary Examiner—Stuart S. Levy
Assistant Examiner—Kevin M. Watkins
Attorney, Agent, or Firm—Merchant, Gould, Smith, Edell, Welter & Schmidt

[57] ABSTRACT

A method and apparatus for detecting degradation in data storage system spindle motor performance is disclosed. A read/write transducer is oriented over a centerline location of a test track on the data storage disk. A data pattern is read from the test track centerline location and the amplitude of the on-track readback signal is determined. The transducer is oriented over a test track location off-set from the centerline location, and the data pattern is read. The amplitude of the off-track readback signal is determined. A deviation of a predetermined magnitude between the on-track and off-track readback signal amplitudes preferably results in the production of a warn signal indicative of degraded spindle motor performance. The off-track readback signal amplitude may alternatively be compared to a predetermined on-track readback signal amplitude stored in the data storage system.

21 Claims, 11 Drawing Sheets

METHOD AND APPARATUS FOR IN-SITU DETECTION OF DATA STORAGE SYSTEM SPINDLE MOTOR PERFORMANCE DEGRADATION

FIELD OF THE INVENTION

The present invention relates generally to data storage systems, and, more particularly, to a method and apparatus for in-situ detection of spindle motor performance degradation.

BACKGROUND OF THE INVENTION

A typical data storage system includes one or more data storage disks coaxially mounted on a hub of a spindle motor. The spindle motor rotates the disks at speeds typically on the order of several thousand revolutions-per-minute. Digital information, representing various types of data, is typically written to and read from the data storage disks by one or more transducers, or read/write heads, which are mounted to an actuator and passed over the surface of the rapidly rotating disks.

The actuator typically includes a plurality of outwardly extending arms with one or more transducers being mounted resiliently or rigidly on the extreme end of the arms. The actuator arms are interleaved into and out of the stack of rotating disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital data is stored in the form of magnetic transitions on a series of concentric, closely spaced tracks comprising the surface of the magnetizable rigid data storage disks. The tracks are generally divided into a plurality of sectors, with each sector comprising a number of information fields. One of the information fields is typically designated for storing data, while other fields contain sector identification and synchronization information, for example. Data is transferred to, and retrieved from, specified track and sector locations by the transducers being shifted from track to track, typically under the control of a controller. The transducer assembly typically includes a read element and a write element. Other transducer assembly configurations incorporate a single transducer element used to write data to the disks and read data from the disks.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element passes over the rotating disk surface, the interaction between the read element and the magnetized locations on the disk surface results in the production of electrical signals in the read element. The electrical signals correspond to transitions in the magnetic field.

Conventional data storage systems generally employ a closed-loop servo control system for accurately and rapidly positioning the actuator and read/write transducers to specified storage locations on the data storage disk. A servo writing procedure is typically implemented to initially record servo information on the surface of one or more of the data storage disks. A servo writer assembly is typically used by manufacturers of data storage systems to facilitate the transfer of servo data to one or more data storage disks during the manufacturing process. In accordance with one known servo information format, termed an embedded servo, servo information is written between the data storing sectors of each track. The servo data is thus embedded in the data storing tracks of the data storage disks, typically resulting in an alternating sequence of data and servo sectors comprising each track.

In accordance with another known servo information format employed in data storage systems, termed a dedicated servo, the servo writer records servo information typically on only one of the data storage disks comprising the disk stack, and often on only one of the surfaces of the dedicated servo disk. The servo information stored on the dedicated servo disk is used to maintain accurate positioning and alignment of the read/write transducers associated with each of the data storage disks. During normal data storage system operation, a servo transducer, generally mounted proximate the read/write transducers, or, alternatively, incorporated as part of the read element of the transducer, is typically employed to read the servo sector data for the purpose of locating specified track and data sector locations on the disk. It is noted that a servo sector typically contains a pattern of data, often termed a servo burst pattern, used to maintain optimum alignment of the read/write transducers over the centerline of a track when reading and writing data to specified data sectors on the track.

It is recognized by those skilled in the art that the performance of the spindle motor is critical to providing a high level of data storage system performance and reliability. Normal and accelerated wearing of the spindle motor assembly and, in particular, the spindle motor bearings, have been associated with a general degradation in data storage system performance. Reading and writing data to and from a data disk, for example, can be negatively affected by a failure mechanism, often referred to as non-repeatable runnout, that results from spindle motor bearing assembly damage. Non-repeatable spindle motor runnout is often induced by irregular or perturbed spindle motor and data storage disk rotation caused by excessively worn or damaged spindle motor bearings.

As the transducer is transferring data to or from a particular track, for example, such perturbations in the rotation of the data storage disk cause the transducer to deviate from its preferred centerline orientation over the track, often resulting in track misregistration and data transfer errors of varying severity. It is noted that detrimental perturbations in spindle motor rotation associated with spindle motor bearing assembly damage generally result in both radial and vertical displacement of the data storage disk in a random, non-repeatable manner. As such, the control algorithm employed in the servo control system typically cannot be modified to accommodate such random off-centerline tracking deviations.

Further, irregularities in the precision machined surfaces of the spindle motor bearings and deformations in the bearing race, for example, typically result in increased friction within the spindle bearing assembly and accelerated bearing assembly fatigue. Increased bearing friction has also been associated with the production of particulate contaminates that can adversely or catastrophically interfere with the operation of other data storage system components. Such undesirable changes in the spindle bearing assembly operating condition generally lead to a progressive degradation in spindle motor performance, increased consumption of spindle motor supply current to overcome additional mechanical friction, and, more significantly, a higher probability of temporary or permanent loss of data stored on one or more data storage disks mounted to the hub of the spindle motor.

It is generally considered highly desirable to detect changes in the performance of the spindle motor early in, and throughout, its service life in order to minimize the probability of intermittent and catastrophic failure of the data storage system. A number of elaborate and typically expensive predictive failure analysis methodologies have been developed in an attempt to detect the existence of failure modes associated with degradation in data storage system performance. Many of these prior art methodologies, for example, can be implemented only after installation of additional supporting electronic hardware and control circuitry into the data storage system, thus adding to the overall cost and complexity of the system. Moreover, such prior art failure analysis procedures often require disassembly of the data storage system housing, or require that a separate, external testing apparatus be coupled to the system in order to perform one or more diagnostic procedures.

A trend has developed in the data storage system manufacturing community to miniaturize the chassis or housing of a data storage system to a size suitable for incorporation into miniature personal computers, such as lap-top and pocket-sized computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto. Recently, four families or types of PCMCIA device specifications have emerged. By way of example, a Type-I PCMCIA data storage system must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

It is anticipated that the industry trend of continued miniaturization of data storage systems will eventually result in the production of systems complying with the Type-II PCMCIA specification. Such Type-II PCMCIA data storage systems will likely have external housing dimensions of approximately 54 mm×86 mm×5 mm, and include a data storage disk having a diameter of approximately 45 mm and a width dimension similar to that of a standard credit card. In small and very small form factor data storage systems, which, in general, are particularly susceptible to spindle motor bearing fatigue, the relatively compact packaging configuration of such miniaturized systems often preclude employment of a predictive failure analysis scheme that requires installation of additional system components.

There exists in the data storage system manufacturing industry a keenly felt need to provide an in-situ spindle motor predictive failure analysis tool that detects degradation in spindle motor performance during the service life of the spindle motor. There exists a further need to provide such a detection tool that requires little or no modification to the existing configuration of a data storage system, and only minimally impacts the standard operation of the system. The present invention fulfills these and other needs.

SUMMARY OF THE INVENTION

The present invention is a method and apparatus for detecting degradation in data storage system spindle motor performance. A read/write transducer is oriented over a centerline location of a test track on the data storage disk. A data pattern is read from the test track centerline location and the amplitude of the on-track readback signal is determined. The transducer is oriented over a test track location off-set from the centerline location, and the data pattern is read. The amplitude of the off-track readback signal is determined. A deviation of a predetermined magnitude between the on-track and off-track readback signal amplitudes preferably results in the production of a warn signal indicative of degraded spindle motor performance. The off-track readback signal amplitude may alternatively be compared to a predetermined on-track readback signal amplitude stored in the data storage system.

DETAILED DESCRIPTION OF THE PREFERRED EMBODIMENTS

Figure 1:
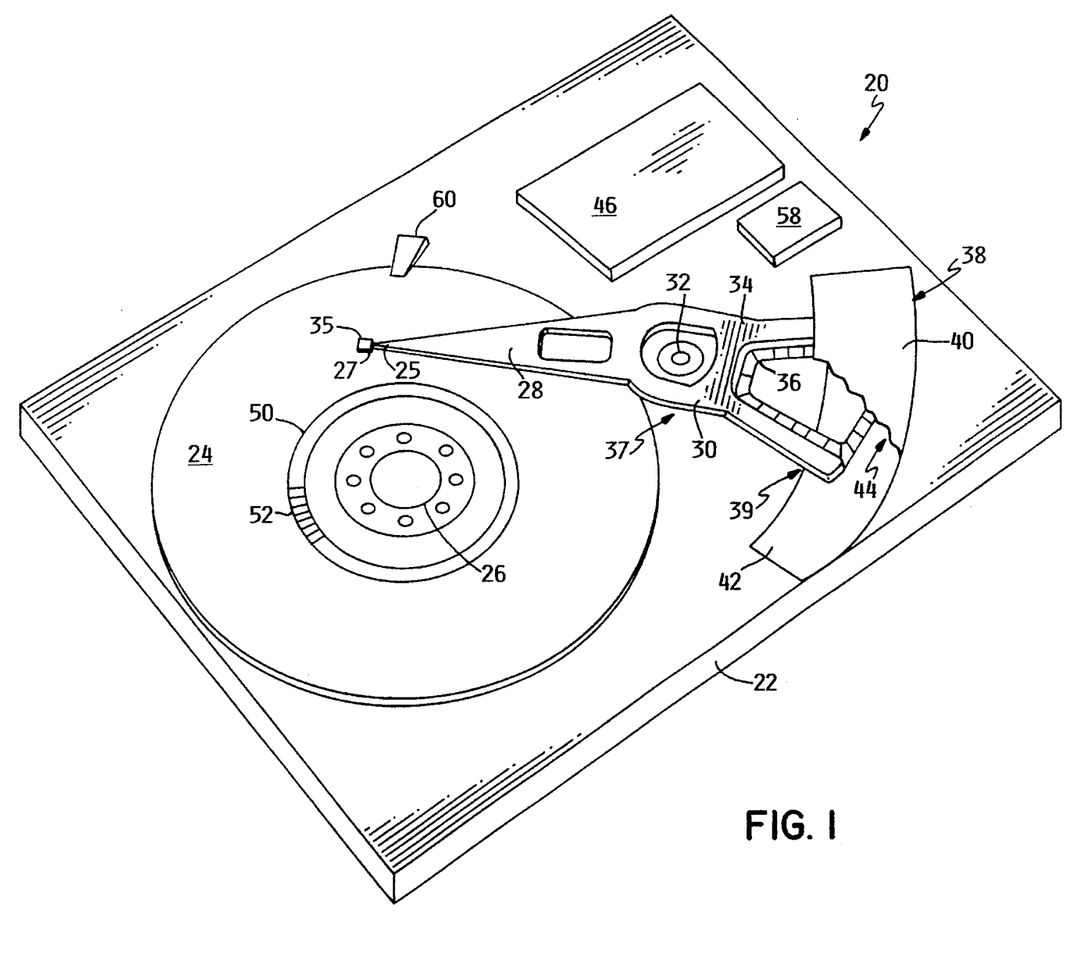
FIG. 1 is a top perspective view of a data storage system with its upper housing cover removed.
Figure 2:
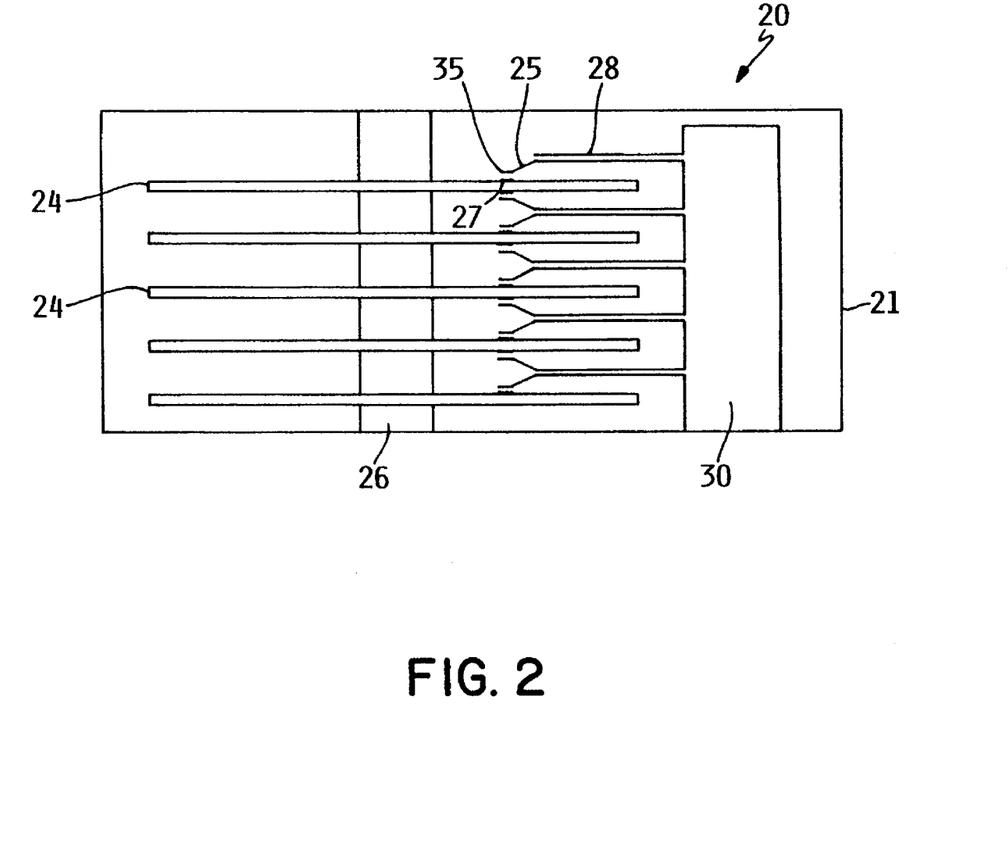
FIG. 2 is a side plan view of a data storage system comprising a plurality of data storage disks.

Referring now to the drawings, and more particularly to FIGS. 1 and 2, there is shown a data storage system 20 with the cover 23 removed from the base 22 of the housing 21. The data storage system 20 typically includes one or more rigid data storage disks 24 which are stacked coaxially in a tandem spaced relationship, and rotate about a spindle motor 26 at a relatively high rate of rotation. Each disk 24 is typically formatted to include a plurality of spaced concentric tracks 50, with each track being partitioned into a series of sectors 52 which, in turn, are further divided into individual information fields. One or more of the disks 24 may alternatively be formatted to include a spiralled track configuration.

An actuator 30 typically includes a plurality of interleaved actuator arms 28, with each arm having one or more transducer 27 and slider body 35 assemblies mounted to a load beam 25 for reading and writing information to and from the data storage disks 24. The slider body 35 is typically designed as an aerodynamic lifting body that lifts the transducer 27 off the surface of the disk 24 as the rate of spindle motor 26 rotation increases, and causes the transducer 27 to hover above the disk 24 on an air bearing or airflow patterns produced by high-speed disk rotation. A conformal lubricant may alternatively be disposed on the surface of the disk 24 to reduce static and dynamic friction between the slider body 35 and surface of the disk 24.

The actuator 30 is usually mounted to a stationary actuator shaft 32, and rotates on the shaft to move the actuator arms 28 into and out of the stack of data storage disks 24. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surface of the data storage disks 24. The spindle motor 26 typically comprises a polyphase, a.c. motor or, alternatively, a d.c. motor, energized by a power supply 46 and adapted for rotating the data storage disks 24.

The coil assembly 36 and the upper and lower magnet assemblies 40 and 42 of the permanent magnet structure 38 operate in cooperation as an actuator voice coil motor 39 responsive to control signals produced by a controller 58. The actuator voice coil motor 39 produces a torquing force on the actuator coil frame 34 when control currents of varying direction and magnitude flow in the coil assembly 36 in the presence of a magnetic field produced by the permanent magnet structure 38. The torquing forces imparted on the actuator coil frame 34, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the actuator voice coil motor 39 to move the actuator arms 28 and transducers 27 to prescribed track 50 and sector 52 locations when reading and writing data to and from the disks 24.

Figure 3:
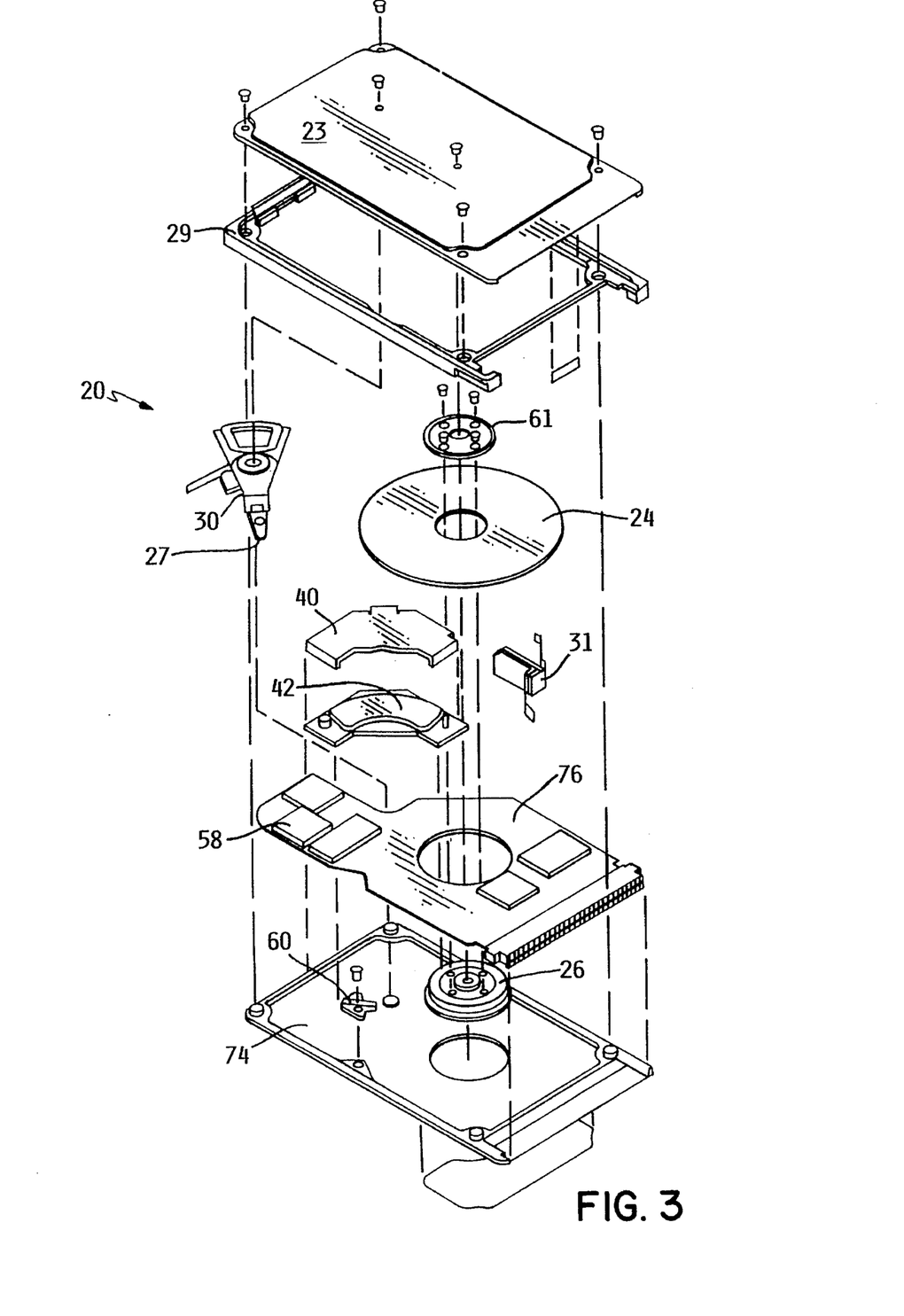
FIG. 3 is an exploded perspective view of a data storage system having a relatively small form factor.

Referring now to FIG. 3, there is illustrated a data storage system 20 having a relatively small form factor, and having housing 21 dimensions generally conforming to one of the PCMCIA housing specifications previously discussed. The compact packaging configuration of small and very small form factor data storage systems 20 typically provides for only minimal separation distances and tolerances between adjacently mounted system components. The vertical or height dimension for a PCMCIA Type-II housing, for example, is specified as being 5 mm. Accordingly, the methodology for mounting the spindle motor 26 to the base casting 74, the actuator 30 to the base casting 74 for rotation between the upper and lower magnet assemblies 40 and 42, and clamping the disk 24 to the spindle motor 26 with the disk clamp 61 must be constrained within less than a 5 mm vertical spacing.

Further, such space limitations generally preclude employment of conventional shock attenuation apparatus, thereby making small form factor data storage systems 20 particularly susceptible to external rotational and short duration shock vibrations. Also, such small form factor data storage systems 20 are typically well-suited for incorporation into portable, notebook, and pocket-size computer systems, which are easily dropped or otherwise subjected to appreciable shock forces. Detrimental shock vibrations are typically transmitted through the base casting 74 or cover 23, amplified by the base casting 74, and impinge on the spindle motor 26 and other internal components mounted within the data storage system housing 21. Although the data storage system 20 may continue to operate after being mishandled, varying degrees of spindle motor 26 bearing damage may result shortly thereafter.

It is well understood that optimum spindle motor 26 operation is essential for maintaining a high level of data storage system 20 performance and reliability. Degradation in spindle motor 26 performance is often attributed to mechanical fatigue in the bearing assembly of the spindle motor 26. Irregularities in the configuration of the bearings or bearing cartridge, for example, can impede the movement of the bearings as the spindle motor 26 rotates at speeds typically on the order of 5,000 to 7,000 revolutions-per-minute. Fabrication and assembly defects associated with the manufacture of individual precision bearings, the bearing cartridge, and the spindle motor assembly often contribute to a significant reduction in the service life of the spindle motor 26.

The novel spindle motor predictive failure analysis method and apparatus provides for early detection of subtle and pronounced changes in the spindle bearing condition which, if undetected, can lead to progressive degradation and accelerated failure of the spindle motor assembly 26. Natural spindle bearing assembly wearout is also detected by periodic execution of the novel spindle motor degradation detection method during the service life of the spindle motor 26. An important advantage of the present invention concerns the detection of subtle changes in spindle motor bearing performance indicative of imminent or progressive bearing assembly deterioration. For example, empirical testing has verified the efficacy of the novel spindle motor predictive failure analysis procedure by detecting spindle motor bearing damage that was audibly undetectable.

Figure 4:
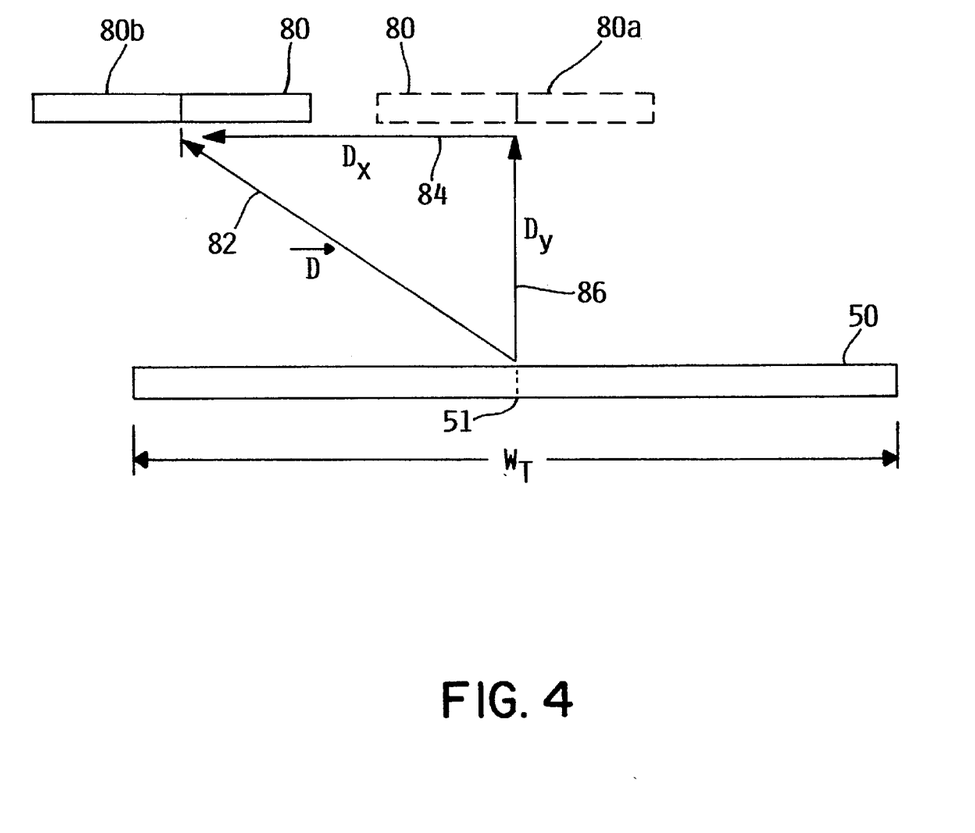
FIG. 4 is an illustration of a read element of a transducer shown in an on-track orientation over the centerline of a track of the disk, and in an off-track orientation with respect to the centerline of the track.

Turning now to FIG. 4, there is shown an illustration of a read element 80 of the transducer 27 oriented over the centerline 51 of a track 50 and oriented off-center with respect to the track centerline 51. For purposes of clarity, the read element 80 oriented above the centerline 51 of the track 50 is designated as the read element 80a, and the read element 80 oriented off-center with respect to the track centerline 51 is designated as the read element 80b. As the read element 80 passes over the track 50 of the rotating disk 24, magnetic transitions developed on the disk 24 surface result in the production of a readback signal induced in the read element 80. By way of example and not of limitation, the readback signal is preferably a voltage signal.

Figure 5:
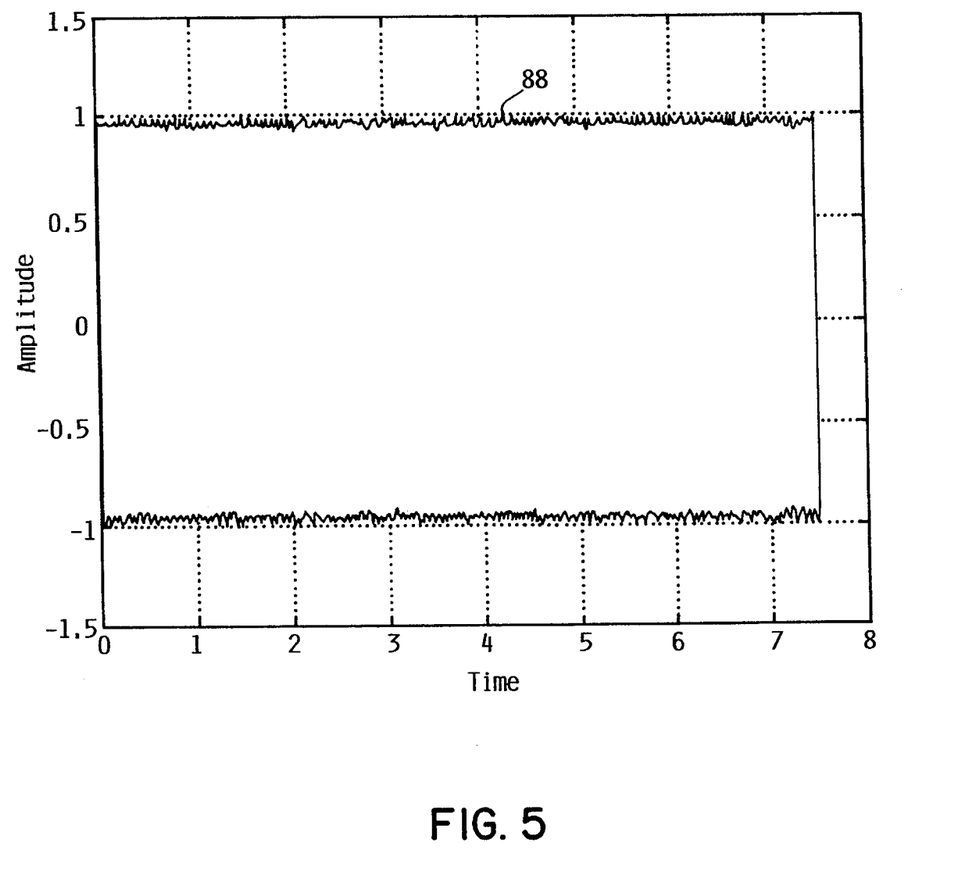
FIG. 5 is an illustration of a readback signal associated with the read element of the transducer oriented over the centerline of a track on the disk.
Figure 6:
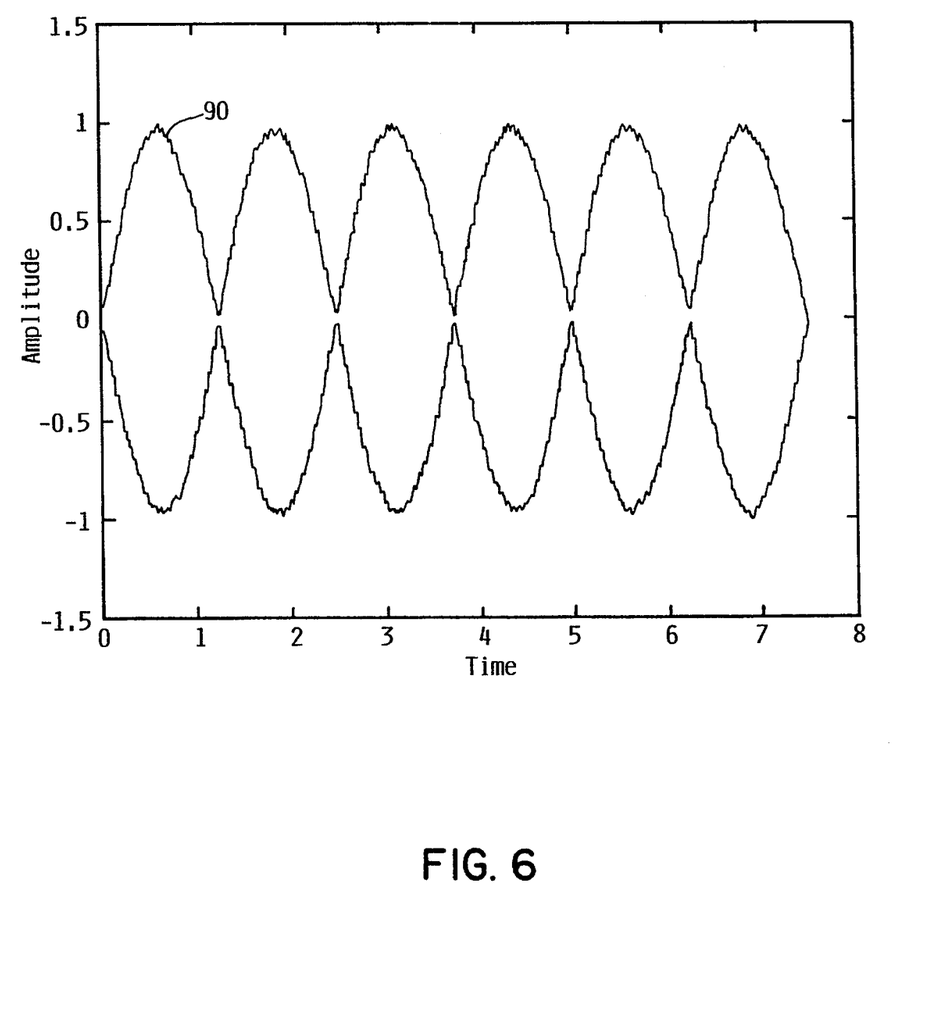
FIG. 6 is an illustration of a modulated readback signal associated with spindle motor bearing damage, and obtained with the read element of the transducer off-set with respect to the centerline of the track.
Figure 7:
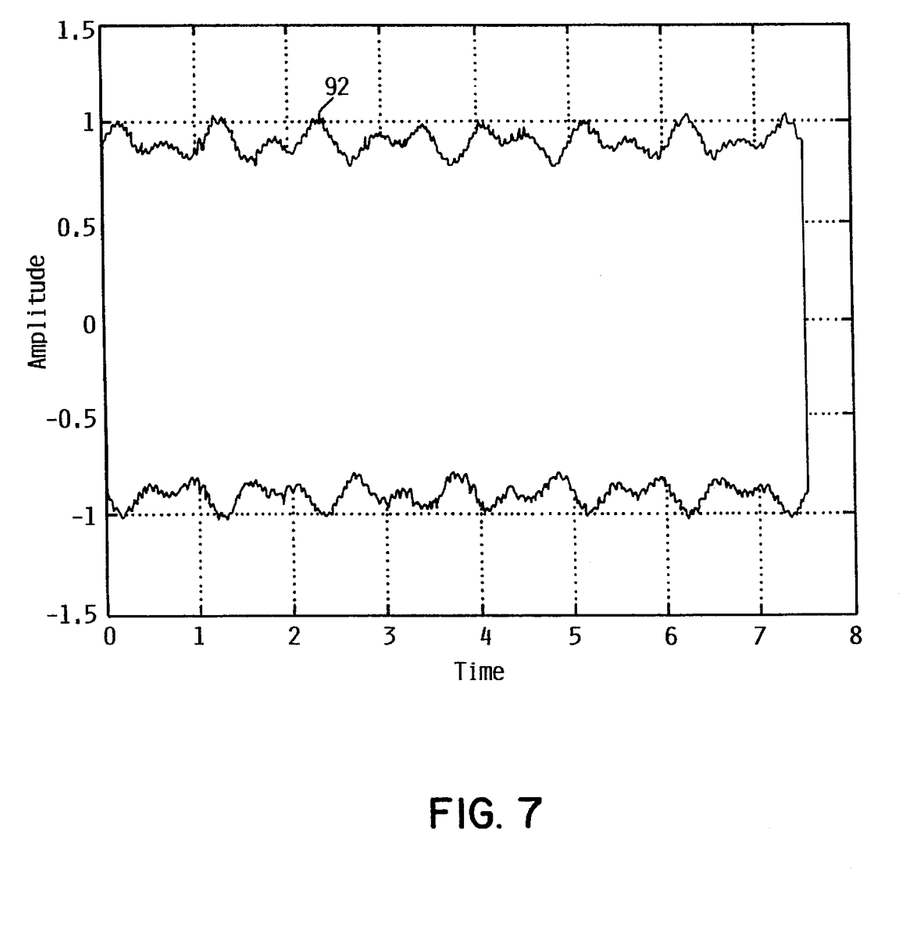
FIG. 7 is another illustration of a modulated readback signal associated with spindle motor bearing damage, and obtained with the read element of the transducer off-set with respect to the centerline of the track.

It has been determined that the readback signal can be used to detect the existence and magnitude of spindle motor bearing assembly degradation. It has further been determined that the read element 80b, when oriented off-center with respect to the track centerline 51, is particularly sensitive to modulations in the readback signal corresponding to spindle motor 26 frequency modes excited by damaged or excessively worn spindle motor bearings. Empirical evaluation of on-track and off-track readback signal waveforms, as illustrated in FIGS. 5–7, has revealed a strong correlation between off-track readback signal modulation and the magnitude of spindle motor bearing deterioration. The novel spindle motor predictive failure analysis procedure exploits this phenomenon and provides for in-situ detection of spindle motor bearing damage and wear using existing data storage system 20 components and without user intervention. It is noted that the term off-track as used herein refers to a read element 80b orientation that is off-set with respect to the centerline 51 of a track 50 having a track width $W_T$.

With further reference to FIG. 4, a vector D 82 is shown extending from the track centerline 51 to the center of the read element 80b. The vector D 82 is shown as having a vertical Y-axis component $D_r$ 86 and a horizontal X-axis component $D_x$ 84. It is noted that the read element 80a when oriented above the track centerline 51 has no horizontal component $D_x$ 84, and only a vertical component $D_x$ 86. Subtle and moderate on-track readback signal modulation is generally difficult to resolve when the read element 80a is oriented above the track centerline 51. Offsetting the read element 80b from the track centerline 51, however, has been found to significantly enhance or increase the sensitivity of the read element 80 to readback signal modulation arising from spindle motor 26 frequency modes excited by defective spindle motor bearings. Damaged or excessively worn spindle motor bearings generally cause perturbations in the normal rotation of the spindle motor 26, resulting in the development of relatively low frequency vibration modes through the spindle motor 26 and data storage disk 24. These vibrations, in turn, modulate the readback signal as the read element 80 senses data patterns on the disk 24 surface. Readback signal modulation associated with disk 24 vibration and non-repeatable spindle motor runout is thus exploited to detect degradation in spindle motor bearing performance.

In FIG. 5, there is illustrated an on-track readback signal waveform produced by the read element 80a oriented over the centerline 51 of the track 50. The on-track readback signal for individual magnetic transitions along the track 50 combine as a function of time to define an on-track readback signal envelope 88 shown as having a substantially constant amplitude and frequency. When the read element 80b is oriented slightly off-center with respect to the track centerline 51, however, subtle and pronounced levels of disk 24 vibration and non-repeatable spindle motor runout are detectable as modulation in the off-track readback signal, as illustrated in FIGS. 6 and 7. The off-track readback signal envelopes 90 and 92 depicted in FIGS. 6 and 7 are modulated by frequencies corresponding to frequencies produced by a damaged or worn spindle motor bearing assembly.

The readback signal envelope 90 illustrated in FIG. 6 is generally depictive of a single spindle motor bearing excitation frequency modulating the off-track readback signal, with the readback signal modulation being substantially synchronous with the rotation of the spindle motor 26. The relatively constant amplitude and frequency of the off-track readback signal envelope 90 is generally depictive of a progressively deteriorating spindle motor bearing assembly condition. A more common and complex off-track readback signal waveform is shown in FIG. 7, and is generally depictive of a non-repeatable spindle motor 26 runout condition. The envelope 92 of the off-track readback signal is generally modulated by a plurality of frequencies associated with spindle motor 26 frequency modes excited by a defective spindle motor bearing assembly.

Figure 8:
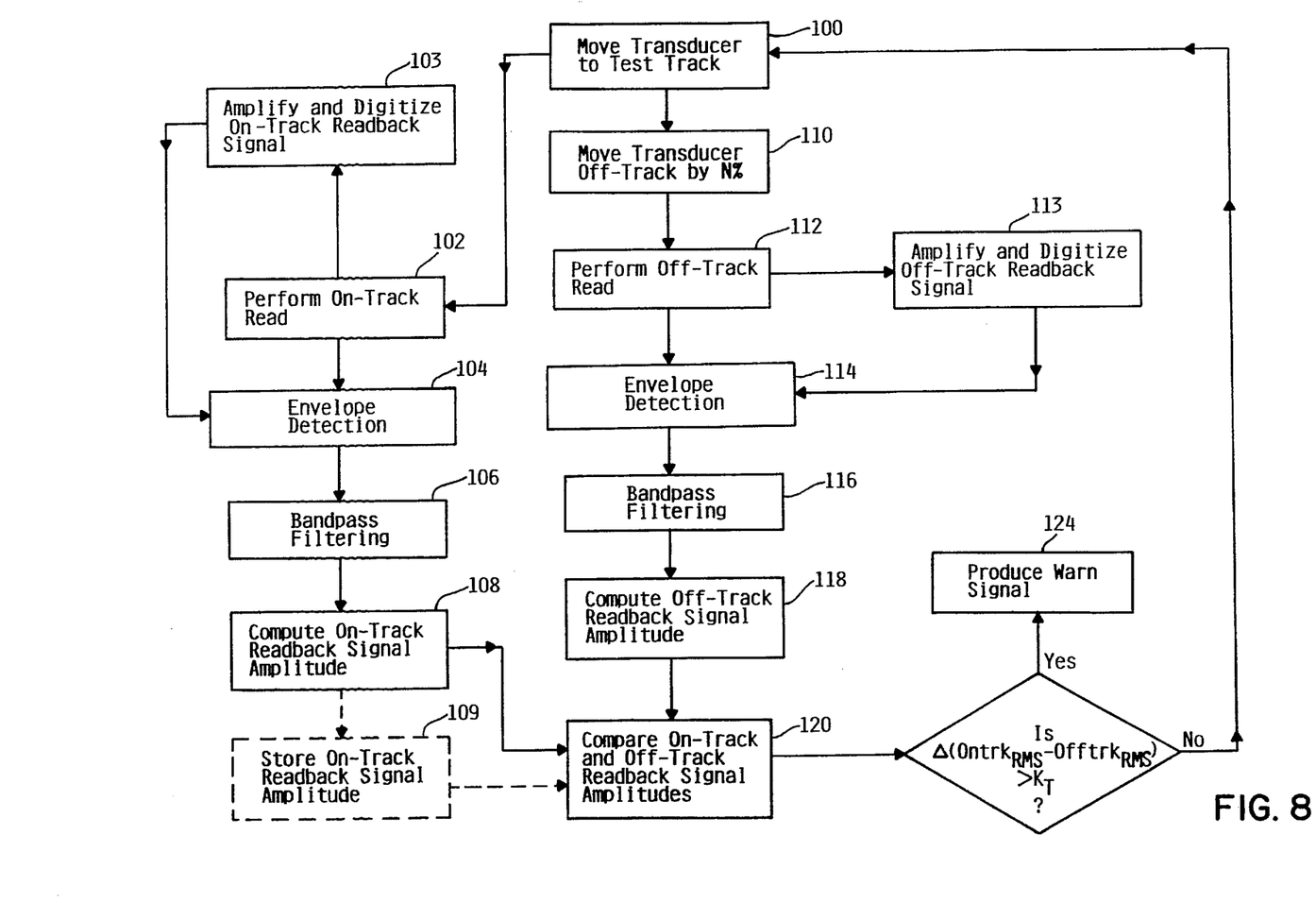
FIG. 8 is a generalized flow diagram of the method steps for performing a novel spindle motor predictive failure analysis procedure in a data storage system utilizing a digital read/write channel.
Figure 9:
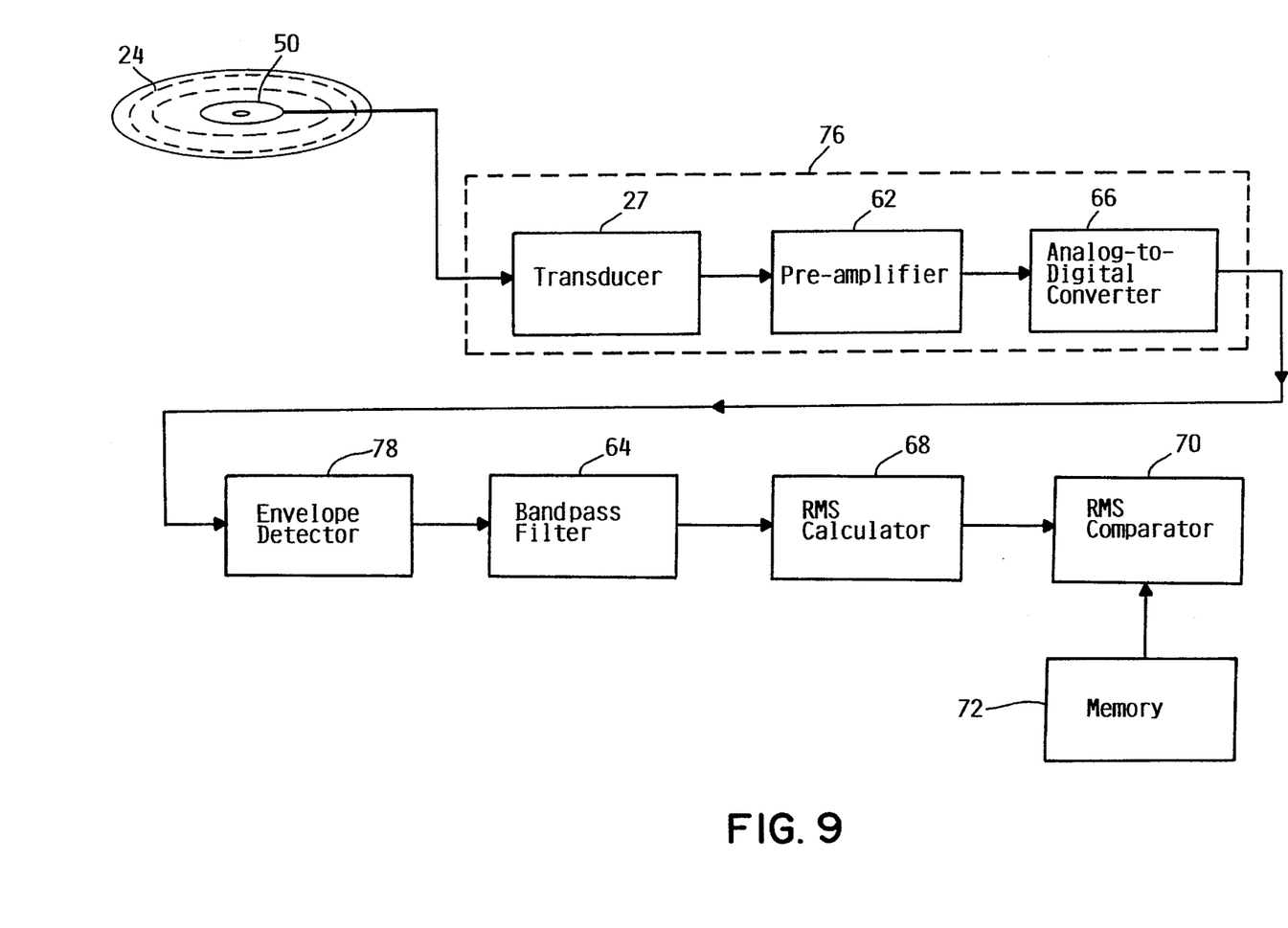
FIG. 9 is a generalized block diagram of the system components for performing a novel spindle motor predictive failure analysis procedure and utilizing a digital read/write channel.
Figure 10:
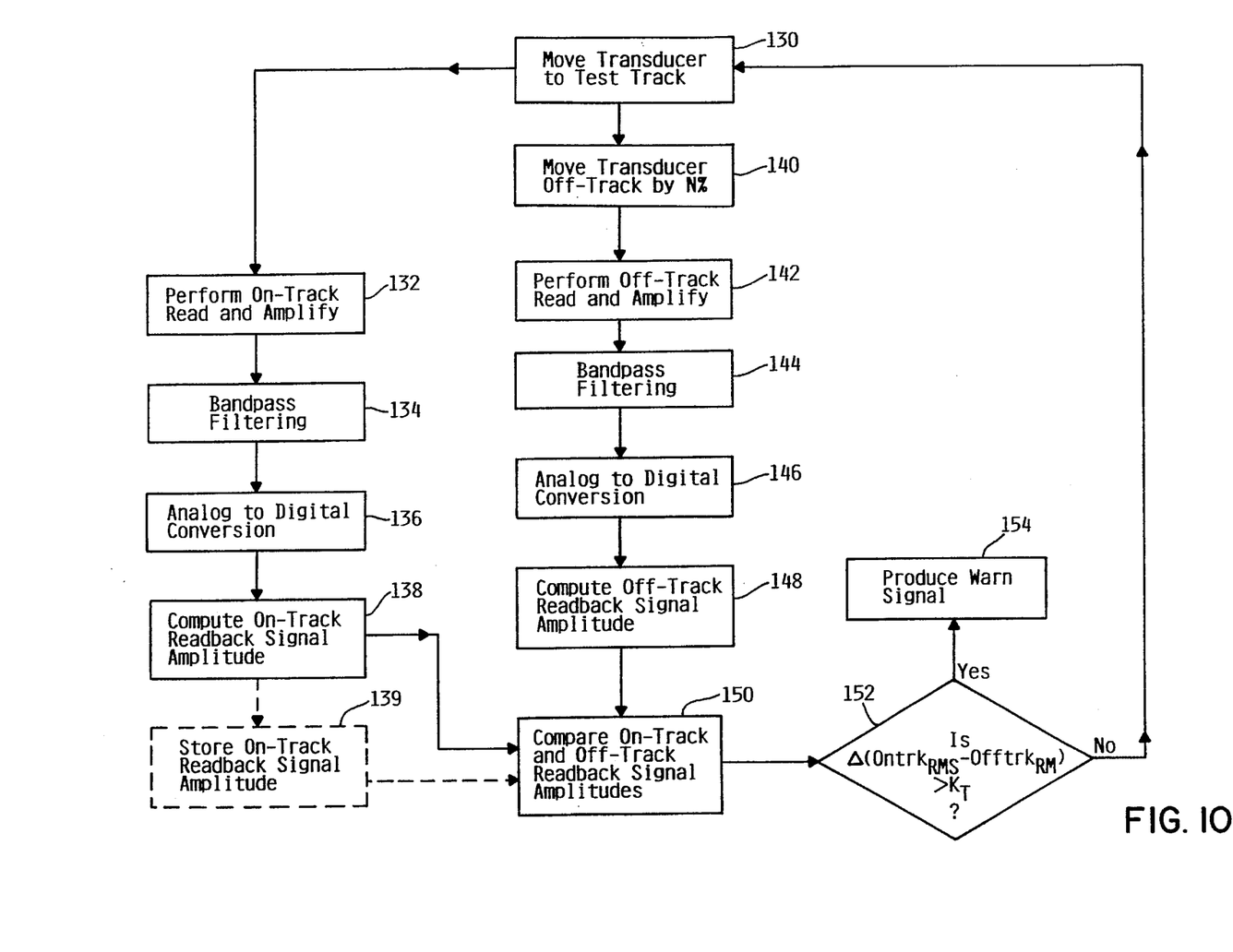
FIG. 10 is a generalized flow diagram of an alternative method for performing a novel spindle motor predictive failure analysis procedure in a data storage system utilizing an analog read/write channel.
Figure 11:
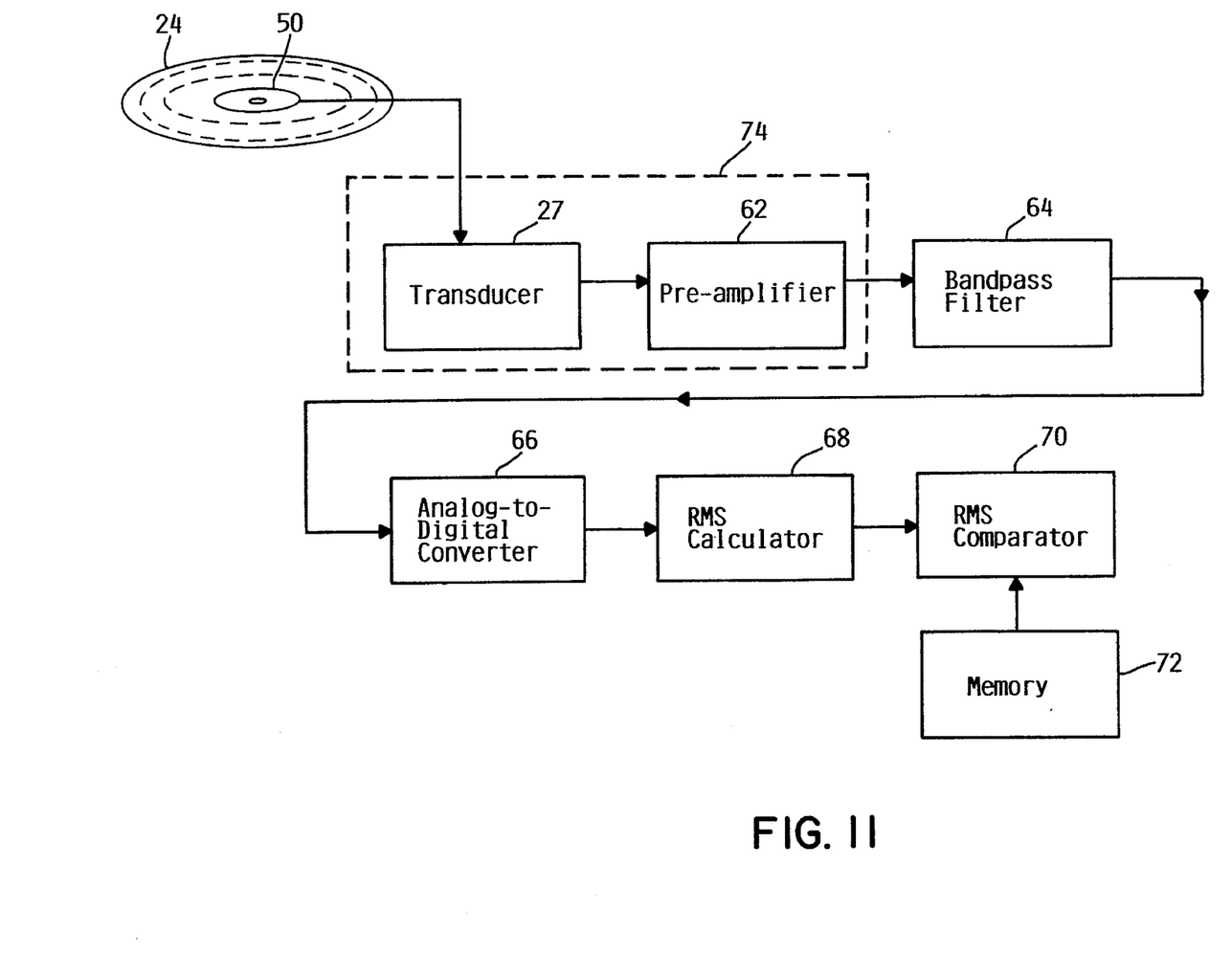
FIG. 11 is a block diagram of the system components employed to perform a novel spindle motor predictive failure analysis procedure and utilizing an analog read/write channel.

Referring now to FIGS. 8–11, the preferred embodiments of the novel spindle motor predictive failure analysis procedure and apparatus are disclosed. In one preferred embodiment, as illustrated in FIGS. 8 and 9, a digital read/write channel 76 is employed to sense readback signals from a test track 50 on the data storage disk 24. In another preferred embodiment, as shown in FIGS. 10 and 11, an analog read/write channel 74 is employed. It is noted that the test track 50 may be one of the plurality of tracks 50 disposed on the disk 24 surface used for storing data, and the information read from the track 50 is preferably a servo burst pattern provided on the track 50. Alternatively, a dedicated test track 50 may be initially written to the disk 24 surface during the servo writing procedure at the time of data storage system 20 manufacture, with a test data pattern being written to the dedicated test track 50. It is to be understood that more than one test track may be employed, and that the test tracks may be located at various radial positions on the disk 24 surface. Further, the detectability of a particular spindle motor 26 failure mechanism often varies as a function of the radial position of the test track on the disk 24 surface. As such, an inner diameter, mid-diameter, and outer diameter test track location on the disk 24 surface may be tested to increase the efficacy of the novel spindle motor degradation determination method and apparatus.

In FIGS. 8 and 9, a preferred embodiment for detecting spindle motor bearing assembly degradation using a digital read/write channel 76 is shown. The transducer 27 is initially moved to the test track 50, with the read element 80a being oriented over the centerline 51 of the test track 50. A data pattern pre-written on the test track 50 is read at step 102. The analog on-track readback signal sensed by the read element 80a is applied to a pre-amplifier 62, amplified, and then digitized by an analog-to-digital converter 66 at step 103. The digitized on-track readback signal is transmitted to an envelope detector 78, at step 104, to detect the existence of modulation in the on-track readback signal. The analog-to-digital converter 66 typically includes integration circuitry which is suitable for performing envelope detection at step 104. At step 106, the on-track readback signal is preferably applied to a programmable digital bandpass filter 64 to remove readback signal frequency content not associated with defective spindle motor bearing excitation frequencies. The root mean square (RMS) amplitude of the filtered on-track readback signal is then computed by an RMS calculator 68 at step 108.

Having computed the on-track readback signal amplitude at step 108, the novel spindle motor predictive failure analysis procedure then computes the off-track readback signal amplitude in accordance with the following steps. It is to be understood that the steps for computing the off-track readback signal amplitude may be performed before or after computing the on-track readback signal amplitude. At step 110, the transducer 27 is moved slightly off-track with respect to the track centerline 51. It has been found that an offset bias of approximately one-half to three-quarters of the track width $W_T$ on either side of the track centerline 51 is sufficient. With the read element 80b oriented off-track with respect to the track centerline 51, an off-track read is performed at step 112. The sensed off-track readback signal is applied to the pre-amplifier 62, amplified, and then converted to a digital signal by the analog-to-digital converter 66 at step 113. The digitized off-track readback signal is received by the envelope detector 78 at step 114, and applied to the digital bandpass filter 64 at step 116. The filtered off-track readback signal is applied to the RMS calculator 68, and the RMS amplitude of the off-track readback signal is computed at step 118.

The RMS amplitudes of the on-track and off-track readback signals are then compared by the RMS comparator 70 at step 120. If, at step 122, the deviation between the on-track and off-track readback signal amplitudes ($\Delta[ONTRK_{RMS}-OFFTRK_{RMS}]$) is greater than a predetermined threshold ($K_T$), a warn signal is preferably produced at step 124 indicating a damaged or severely worn spindle motor 26 bearing condition. It has been empirically determined that a deviation between on-track and off-track readback signal amplitudes for a spindle motor 26 having damaged bearings is approximately 50 percent to 150 percent greater than the deviation for a spindle motor 26 having undamaged bearings.

In another preferred embodiment, as illustrated in FIGS. 10 and 11, the novel spindle motor predictive failure analysis procedure and apparatus is employed in a data storage system 20 utilizing an analog read/write channel 74. The predictive failure analysis procedure implemented for such systems is similar to that previously described with respect to FIGS. 8 and 9. The transducer 27 is moved to a test track 50 of the disk 24 at step 130, and an analog on-track readback signal is sensed and amplified by a pre-amplifier 62 at step 132. The analog on-track readback signal is applied to a bandpass filter 64 at step 134 to remove readback signal frequency content not associated with defective spindle motor bearing excitation frequencies. The filtered on-track readback signal is transmitted to an analog-to-digital converter 66 at step 136, and the RMS amplitude of the on-track readback signal is computed by the RMS calculator 68 at step 138.

At step 140, an off-track readback signal is sensed by moving the read element 80b off-track with respect to the track centerline 51 by a predetermined distance or percentage of the track width $W_T$. The off-track readback signal is then bandpass filtered at step 144, and converted to digital form at 146. The RMS amplitude of the digitized off-track readback signal is then computed at 148, and compared with the on-track readback signal amplitude at step 150. If the deviation between the on-track and off-track readback signal amplitudes ($\Delta[ONTRK_{RMS}-OFFTRK_{RMS}]$) is greater than a predetermined threshold ($K_T$), a warn signal is preferably produced at step 154 and communicated to a host computer coupled to the data storage system 20. A message is preferably communicated to the user of the host computer indicating that the data storage system 20 requires repair or replacement.

In another preferred embodiment, the steps for sensing the on-track readback signal and computing the on-track readback signal amplitude are preferably performed at or near the time of data storage system 20 manufacture. The computed on-track readback signal amplitude for a predetermined test track 50 is then preferably stored, at steps 109 and 139, in a memory device disposed within the data storage system 20. Electrically erasable programmable read-only-memory (EEPROM), or other type of read-only-memory, is typically accessible by a microprocessor of the controller 58, and is suitable for storing the predetermined on-track readback signal amplitude. During the service life of the spindle motor 26, the novel spindle motor predictive failure analysis procedure is preferably performed to detect degradation in spindle motor 26 performance. When performed, an off-track readback signal amplitude is computed using the predetermined test track in a manner previously discussed, and is compared to the predetermined on-track readback signal amplitude stored in system memory. A deviation between the predetermined on-track readback signal amplitude and the in-service off-track readback signal amplitude beyond a predetermined threshold $K_r$ preferably results in the communication of a warn signal to the host computer coupled to the data storage system 20.

Another important advantage concerns the use of existing data storage system hardware and software to perform the in-situ spindle motor predictive failure analysis procedure without resort to additional, and typically costly, components. This concern is generally of critical importance in the design and manufacture of small and very small form factor data storage systems 20. In most data storage systems 20 utilizing a digital read/write channel 76, a digital signal processor (DSP) or servo processor of the system 20 is employed to control the positioning of the actuator 30 and transducer 27 over the disk 24, and to coordinate the transfer of data to and from the disk 24 surface. The DSP or servo processor is generally capable of performing envelope detection and bandpass filtering. The desired frequency response of the digital bandpass filter 64 is preferably programmed into the microcode of the DSP or servo processor. The RMS amplitude calculations and comparisons can typically be performed by the microprocessor of the controller 58 or directly by the DSP or servo processor. The DSP or servo processor can further control the bias applied to the actuator 30 to move the transducer 27 and read element 80 to an orientation off-set from the centerline 51 of the track 50 when the off-track measurements are being taken. The standard components of a data storage system 20 utilizing an analog read/write channel 74 are generally capable of performing the described functions for implementing the novel spindle motor degradation detection methodology.

It will, of course, be understood that various modifications and additions can be made to the embodiments discussed hereinabove without departing from the scope or spirit of the present invention. For example, the novel spindle motor predictive failure analysis method and apparatus may be employed in systems employing optical data disks, or disks having spiralled or other non-concentric track configurations. Accordingly, the scope of the present invention should not be limited to the particular embodiments discussed above, but should be defined only by the claims set forth below and equivalents of the disclosed embodiments.

What is claimed is:

1. A method for detecting degradation in the performance of a data storage system having a data storage disk for storing data, a spindle motor having bearings and adapted for rotating the data storage disk, a transducer for transferring data to and from a track of the disk, an actuator for moving the transducer across the disk, and a controller for coordinating the transfer of data to and from the disk, the performance degradation detection method comprising the steps of:

sensing an off-track readback signal having a range of frequencies associated with degradation of the spindle motor, the off-track readback signal being sensed from a test location on a track of the data storage disk, the test location being a location of the track other than a centerline location of the track;

filtering the off-track readback signal to pass the range of frequencies associated with the degradation of the spindle motor;

determining a magnitude difference between the filtered off-track readback signal and an on-track readback signal; and using the magnitude difference between the filtered off-track readback signal and the on-track readback signal to indicate degradation in spindle motor performance.

2. A method as claimed in claim 1, including the further step of retrieving the on-track readback signal.

3. A method as claimed in claim 1, including the further step of:

computing a root mean square of the off-track readback signal; and the step of determining the magnitude difference includes the step of comparing the root mean square of the off-track readback signal with a root mean square of the predetermined on-track readback signal.

4. A method as claimed in claim 1, wherein the step of sensing the off-track readback signal includes the step of sensing a data pattern disposed on the track.

5. A method as claimed in claim 1, wherein the step of sensing the off-track readback signal includes the step of sensing servo burst data disposed on the track.

6. A method as claimed in claim 1, including the further step of comparing an amplitude of the off-track readback signal with an amplitude of the predetermined on-track readback signal.

7. A method as claimed in claim 1, wherein the filtering step includes the step of filtering off-track readback signal frequencies to pass a frequency range of approximately 3 to 10 kilohertz.

8. A method as claimed in claim 1, wherein the steps of claim 1 are repeated for a plurality of tracks on the disk.

9. A method as claimed in claim 1, including the further step of producing a warn signal in response to the magnitude difference between the on-track readback signal and the filtered off-track readback signal exceeding a predetermined threshold.

10. A method for detecting degradation in the performance of a data storage system having a data storage disk for storing data, a spindle motor having bearings and adapted for rotating the data storage disk, a transducer for transferring data to and from a track of the disk, an actuator for moving the transducer across the disk, and a controller for coordinating the transfer of data to and from the disk, the performance degradation detection method comprising the steps of:

sensing an on-track readback signal from a centerline location of a track of the data storage disk;

sensing an off-track readback signal having a range of frequencies associated with degradation of the spindle motor, the off-track readback signal being sensed from a track location other than the centerline location of the track;

filtering the off-track readback signal to pass the range of frequencies associated with the degradation of the spindle motor;

determining a magnitude difference between the filtered off-track readback signal and the on-track readback signal; and using the magnitude difference between the on-track readback signal and the filtered off-track readback signal to indicate degradation in spindle motor performance.

11. A method as claimed in claim 10, including the further steps of:

computing a root mean square of the on-track readback signal; and computing a root mean square of the off-track readback signal; and the step of determining the magnitude difference includes the step of comparing the root mean square of the on-track readback signal with the root mean square of the off-track readback signal.

12. A method as claimed in claim 10, wherein the steps of sensing the on-track and off-track readback signals each include the step of sensing a data pattern disposed on the track.

13. A method as claimed in claim 10, including the further step of:

filtering the on-track readback signal to pass a range of frequencies associated with defective spindle motor bearings;

wherein the step of determining the magnitude difference includes the step of comparing the filtered on-track and the filtered off-track readback signals.

14. A method as claimed in claim 10, wherein the steps of claim 11 are repeated for a plurality of tracks on the disk.

15. A method as claimed in claim 10, including the further step of producing a warn signal when the magnitude difference between the on-track readback signal and the filtered off-track readback signal exceeds a predetermined threshold.

16. An apparatus for detecting degradation in the performance of a spindle motor disposed in a data storage system, the apparatus comprising:

a data storage disk having a track;

means for sensing an off-track readback signal having a range of frequencies associated with degradation of the spindle motor, the off-track readback signal being sensed from a location of the track other than a centerline location of the track;

means for filtering the off-track readback signal to pass the range of frequencies associated with the degradation of the spindle motor;

means for determining a magnitude difference between the filtered off-track readback signal and an on-track readback signal; and means for using the magnitude difference between the filtered off-track readback signal and the on-track readback signal to indicate degradation in spindle motor performance.

17. An apparatus as claimed in claim 16, further comprising:

means for computing the amplitude of the filtered off-track readback signal; and means for computing the amplitude of the filtered off-track readback signal with the amplitude of the on-track readback signal.

18. An apparatus as claimed in claim 16, further comprising:

memory disposed in the data storage system; and the determining means comprises means for retrieving the on-track readback signal from the memory.

19. A system for storing data comprising:

a housing;

a data storage disk having a track;

a spindle motor having bearings, the spindle motor being mounted to the housing and adapted for rotating the data storage disk;

an actuator movably mounted to the housing;

a transducer mounted to the actuator; and a spindle motor degradation detection apparatus comprising:

means for sensing an off-track readback signal having a range of frequencies associated with degradation of the spindle motor, the off-track readback signal being sensed from a location of the track other than a centerline location of the track;

means for filtering the off-track readback signal to pass the range of frequencies associated with the degradation of the spindle motor;

means for determining a magnitude difference between the filtered off-track readback signal and an on-track readback signal; and means for using the magnitude difference between the filtered off-track readback signal and the on-track readback signal to indicate degradation in spindle motor performance.

20. An apparatus as claimed in claim 19, further comprising:

means for computing the amplitude of the filtered off-track readback signal; and means for comparing the amplitude of the filtered off-track readback signal with the amplitude of the on-track readback signal.

21. An apparatus as claimed in claim 19, further comprising:

memory disposed in the data storage system; and the determining means comprises means for retrieving the on-track readback signal from the memory.

* * * * *